(12) United States Patent
Wikstrom

(10) Patent No.: US 7,316,446 B2
(45) Date of Patent: Jan. 8, 2008

(54) SUPPORTING PART OF A VEHICLE DOOR

(75) Inventor: Lars Wikstrom, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 10/591,021

(22) PCT Filed: Feb. 17, 2005

(86) PCT No.: PCT/SE2005/000209

§ 371 (c)(1),
(2), (4) Date: Aug. 29, 2006

(87) PCT Pub. No.: WO2005/087527

PCT Pub. Date: Sep. 22, 2005

(65) Prior Publication Data

US 2007/0187986 A1  Aug. 16, 2007

(30) Foreign Application Priority Data

Mar. 11, 2004 (SE) .................................. 0400602

(51) Int. Cl.
*B60J 5/04* (2006.01)
(52) U.S. Cl. ................................ 296/146.6; 296/146.5

(58) Field of Classification Search ............. 296/146.5, 296/146.6, 146.2, 146.7
See application file for complete search history.

(56) References Cited

U.S. PATENT DOCUMENTS 4,800,638 A * 1/1989 Herringshaw et al. ..... 29/407.1

FOREIGN PATENT DOCUMENTS

WO      2004/014682      2/2004

* cited by examiner

*Primary Examiner*—Joseph D. Pape
(74) *Attorney, Agent, or Firm*—Mark P. Stone

(57) ABSTRACT

A vehicle door has a supporting annular frame 12-19 of high strength steel close to the outer panel and the frame is stamped from a plane sheet so that a side impact guard beam (20) is formed in the same stamping operation. Both the annular frame and the side impact guard beam have hat-formed cross section, and reinforcement plates (21, 22) couple together the outer and inner flanges (26, 27) and give the frame a closed cross section at the connections of the side impact guard beam to the annular frame. The outer side flange (26) of the annular frame carries the outer panel of the door, and the other elements of the door are screwed on the frame 12-19 at the interior side of the frame.

8 Claims, 2 Drawing Sheets

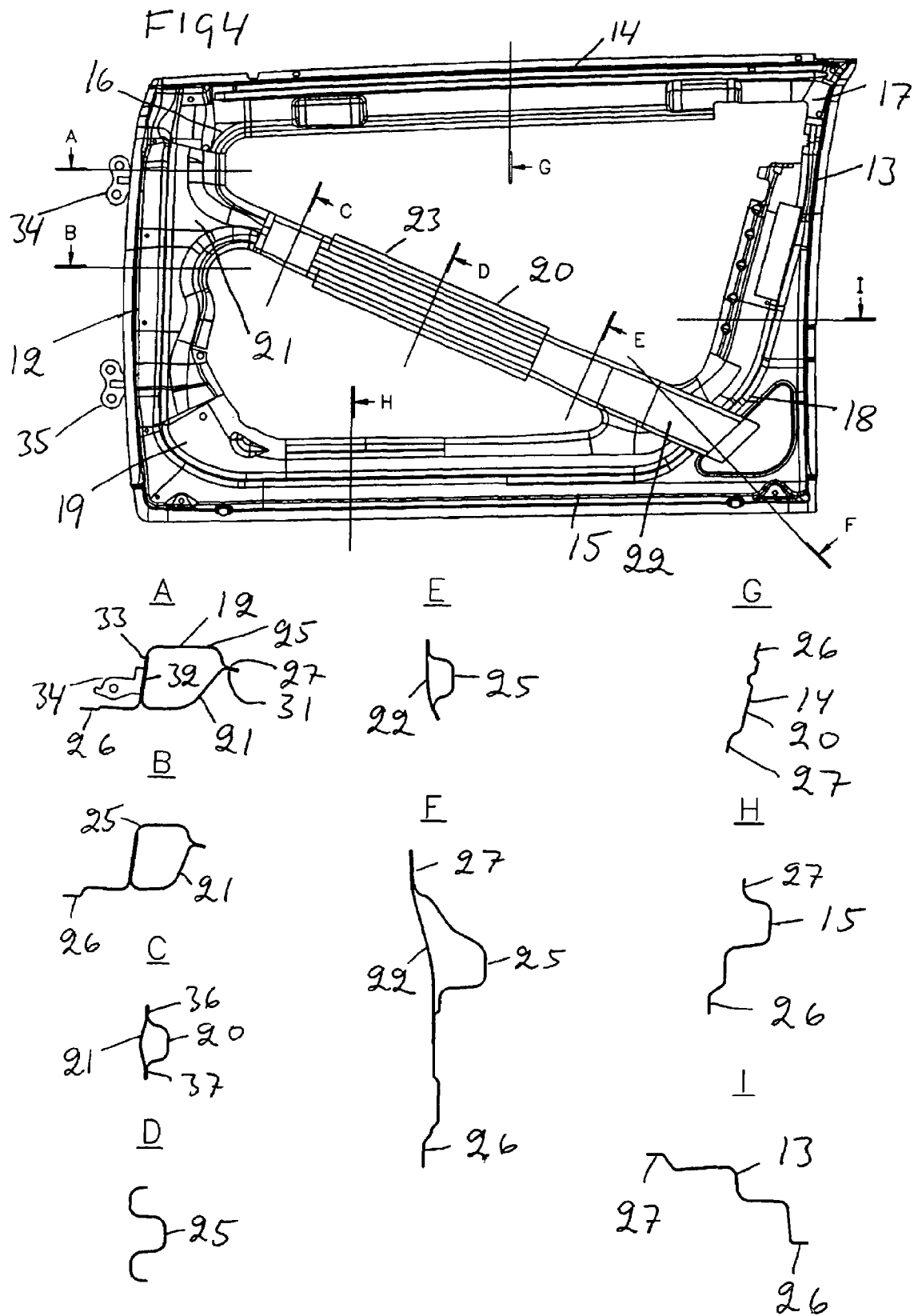

SUPPORTING PART OF A VEHICLE DOOR

TECHNICAL AREA

This invention relates to a supporting part of a vehicle door; comprising an annular frame that has two standing members united by means of two horizontal members, wherein the frame has an open generally hat-formed cross-section with a central portion and outer and inner flanges and is adapted to carry the outer panel of the door by its outer side flange, and a side impact guard bridges the hole in the annular frame.

BRIEF DESCRIPTION OF PRIOR ART

A vehicle door of this kind is described in WO2004/014682. Its supporting part is close to the outer panel of the door, that is, as far as possible from the passenger, which is an advantage as to safety.

OBJECT OF INVENTION AND BRIEF DESCRIPTION OF THE INVENTION

It is an object of the invention further to increase the impact protection properties of a supporting part of a vehicle door of the kind mentioned above.

This object is achieved by means coupled between the outer and inner side flanges of the frame at the connections of the side impact guard to the annular frame. When the side impact guard is bent inwards at a side impact, the cross-section of the hat beam will thereby have an increased resistance to deformation at its connections with the side impact guard beam, which both reduces the inward bending of the impact guard beam and increases the overall resistance to the side impact.

BRIEF DESCRIPTION OF THE DRAWINGS, WHICH ILLUSTRATE AN EMBODIMENT OF THE INVENTION

FIG. 4 shows the frame of FIG. 1 with the reinforcement elements of FIGS. 2 and 3 mounted, and sections A-I marked in the figure are shown separately.

DESCRIPTION IN DETAIL OF THE ILLUSTRATED AND PREFERRED EXAMPLE OF THE INVENTION

Figure 1:
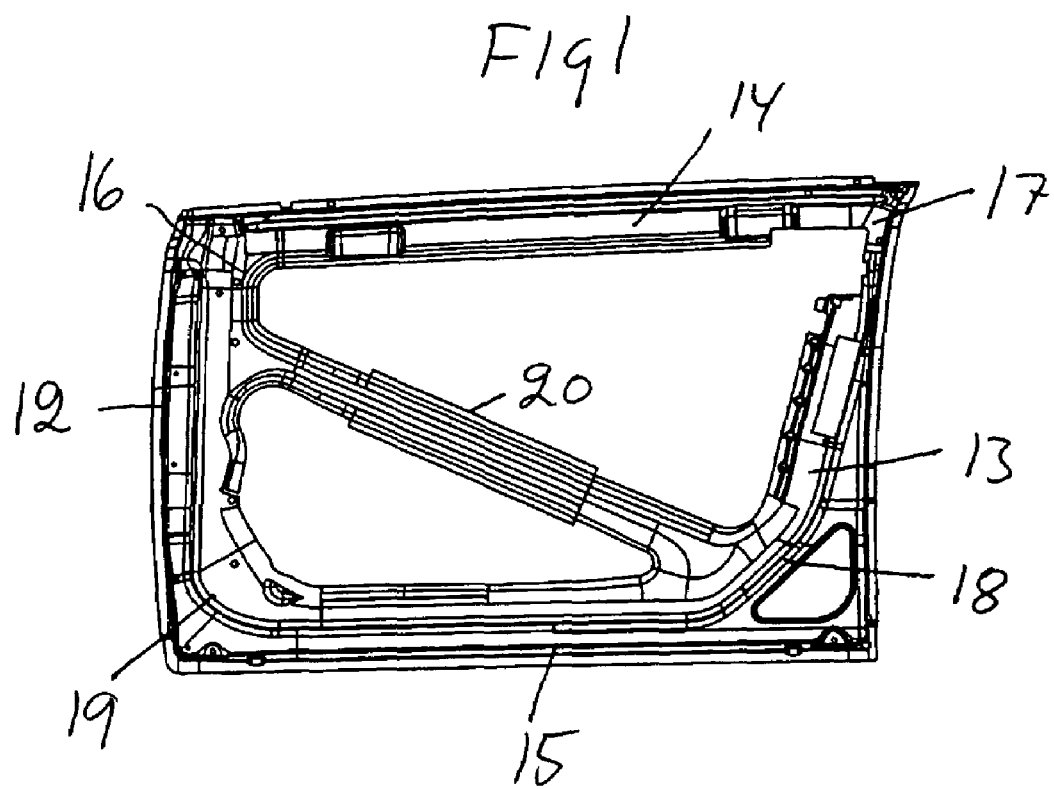
FIG. 1 is a side view; seen from the outside; of the supporting frame of a vehicle door and it shows the frame without its reinforcement elements that are shown in FIGS. 2 and 3.

FIG. 1 shows in a side view the supporting part of a vehicle door seen from outside. The supporting part comprises an annular frame that has front and rear standing members (beams) 12,13 and upper and lower horizontal members 14,15 (beams) with bends 16-19 between the members. An additional side impact guard in the form of a beam 20 extends between the two upstanding beams and it slopes to the back. The side impact guard bridges in this way the hole in the annular frame.

Figure 2:
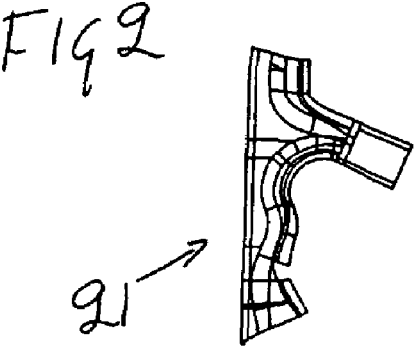
FIGS. 2 and 3 show reinforcement elements for the frame.
Figure 3:
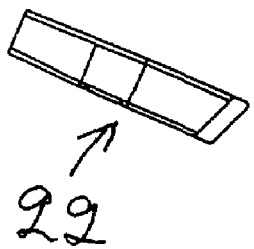

FIG. 2 shows a reinforcement element 21 for the front connection of the side impact guard beam and FIG. 3 shows a reinforcement element 22 for the rear connection.

FIG. 4 shows the frame of FIG. 1 with the elements 21,22 of FIGS. 2 and 3 mounted. The beams and bends 12-19 of the annular frame have a generally hat-formed cross section with varying profile and they form together an annular hat beam. The hat beam has a central portion (crown) 25 with varying appearance facing the interior of the vehicle and outer and inner side flanges 26,27 facing the outside of the door. The outer side flange 26 has a width that varies and is adapted to the outer panel of the door. The outer panel is folded around the flange with glue in the fold or it is fastened in another way. The outer side flange 26 is very wide in the bend 18 since the bend is adapted to the pillar of the vehicle. The hat-form is much modified in the section I since the inner side flange 27 is extended in order to make, by means of a number of screw holes, a support for the interior elements of the door, and in section G, the crown of the hat beam is very low so as to make space for the window construction between itself and the impact guard 20, that is, the impact guard beam 20. The hat-shaped transverse section of the frame is in this way adapted to function, door design and available space.

The side impact guard beam 22 may also be a hat beam and it may have a simple design at its connections to the annular frame as shown in sections C and D, and it may be reinforced at a central portion 23, as shown by section D, for example by being wider and having the edges of its side flanges bent.

The annular frame 12-19 with its side impact guard beam 20 is suitably formed as a single piece from a plane sheet. It may be cold formed in high-strength sheet steel, but if it is hot stamped and hardened in a single operation in cooled forming tools in the so called press hardening process, still higher strength may be achieved. A tensile strength of 1000 MPa (1000 N/mm$^2$) or even over 1500 MPa may be achieved.

The impact guard beam 20 is connected to the annular frame in the area for the upper hinge 34 of the door. It slopes downwards/backwards and it is connected to the bend 18. Thereby, if the door is a front door, it will improve the ability of the door to transmit force from the upper portion of the A-pillar of the vehicle to the lower portion of the B-pillar of the vehicle in case of a frontal crash. The side impact guard need not be in the form of a simple beam, but it may have other forms; it may for example be in the form of a cross with connections to all four frame members 12-15 and it need not necessarily have the profile of a hat beam.

The reinforcement element 21 has a flange 31 that is fastened to the inner side flange 27 of the annular frame, suitably by dot welding or another kind of welding and it has a bent portion 32 that is fastened to the front web 33 of the hat beam 12, suitably by dot welding or any other kind of welding, and it is a reinforcement for the fastening of both hinges 34,35 of the door. In this way, the reinforcement element 21 will also couple together the outer and inner flanges 26,27 at the area of the connection of the side impact guard beam 20 to the annular frame. Thus, the reinforcement element 21 gives the standing hat beam 12 a closed cross section at the two hinge fastenings and all the way between them.

The reinforcement element 21 is also fastened to the side impact beam 20, which is shown as a hat beam, by being welded to the side flanges 36,37 of the side impact beam as shown in section C.

As can be seen from sections E and F, the reinforcement element 22 is fastened both to the side impact guard beam 20 and to the inner and outer flanges 27,26, suitably by dot welding or another kind of welding, and, thus, it couples together the two flanges 26,27 of the side impact guard beam 20 by making the cross section of the side impact beam closed all the way to the wider central portion 23 of the side impact beam, which is left open. In the same way, the reinforcement element 21 gives the side impact beam 20 a closed cross section all the way to the central portion 23 of the beam. With the expression "closed cross section" is meant a cross section, which has the function of a closed cross section and will prevent the hat beam from flattening out. Thus, it need not be completely closed but may have openings.

When the side impact guard beam 20 bulges inwards in a side collision, its connections will be tension loaded and the reinforcement elements 21 and 22, which give the annular frame a closed cross section, give the annular frame increased resistance to be deformed at these connections.

The outer panel of the door is folded around the outer side flange 26 of the frame and all other door elements are screwed to the interior side of the frame. These elements may be pre-assembled as a unit that is screwed on the frame, which makes it easy to assemble the door initially and also easy to disassemble it for service and then reassemble it.

The invention claimed is:

1. A supporting part of a vehicle door, comprising an annular frame (12-19) that has two standing members (12, 13) united by means of two horizontal members (14, 15), wherein the frame has an open generally hat-formed cross-section with a central portion (25) and outer and inner flanges (26, 27) and is adapted to carry the outer panel of the door by its outer side flange (26), and a side impact guard (20) bridges the hole in the annular frame, characterised by means (21, 22) coupled between the outer side flange (26) of the frame and the inner side flange (27) at the connections of the side impact guard (20) to the annular frame (12-19).

2. The supporting part according to claim 1, characterised in that the side impact guard (20) is stamped from a steel sheet together with the annular frame.

3. The supporting part according to claim 1, characterised in that the side impact guard comprises a beam (20) coupled to the forward standing member (12), and the means (21) for coupling together said outer and inner flanges (26, 27) at the front end of the impact guard beam is arranged to give both the forward standing frame member (12) and the front end of the side impact guard beam a closed profile.

4. The supporting part according to claim 3, characterised in that the frame has an upper and a lower fastening for hinges (34, 35), and the means (21) for coupling together the outer and inner flanges at the front end of the impact guard beam is arranged to give the forward standing frame member (12) a closed profile both at the upper and the lower hinge fastenings.

5. The supporting part according to claim 4, characterised in that the means (21) for coupling together the outer and inner flanges (26, 27) at the front end of the impact guard beam is bent to make a reinforcement for the hinge fastenings.

6. The supporting part according to claim 2, characterised in that the side impact guard comprises a beam (20) coupled to the forward standing member (12), and the means (21) for coupling together said outer and inner flanges (26, 27) at the front end of the impact guard beam is arranged to give both the forward standing frame member (12) and the front end of the side impact guard beam a closed profile.

7. The supporting part according to claim 6, characterised in that the frame has an upper and a lower fastening for hinges (34, 35), and the means (21) for coupling together the outer and inner flanges at the front end of the impact guard beam is arranged to give the forward standing frame member (12) a closed profile both at the upper and the lower hinge fastenings.

8. The supporting part according to claim 7, characterised in that the means (21) for coupling together the outer and inner flanges (26, 27) at the front end of the impact guard beam is bent to make a reinforcement for the hinge fastenings.

* * * * *